United States Patent [19]

Ojima et al.

[11] Patent Number: 4,794,040

[45] Date of Patent: Dec. 27, 1988

[54] MAGNETIC RECORDING MEDIUM HAVING A BACK COAT LAYER CONTAINING CARBON BLACK HAVING DEFINED RANGES OF PH AND COLORING POWER

[75] Inventors: Kumiko Ojima; Yukio Matsumoto, both of Mito; Hiroshi Togashi, Yamagata; Hiroshi Ogino, Mito, all of Japan

[73] Assignee: Victor Company of Japan, Ltd., Yokohama, Japan

[21] Appl. No.: 867,685

[22] Filed: May 28, 1986

[30] Foreign Application Priority Data

May 29, 1985 [JP] Japan .................................. 60-114187
May 29, 1985 [JP] Japan .................................. 60-114188

[51] Int. Cl.$^4$ ................................................ G11B 5/72
[52] U.S. Cl. ..................................... 428/323; 427/128; 427/131; 428/408; 428/328; 428/329; 428/522; 428/694; 428/695; 428/900; 428/425.9
[58] Field of Search ............... 428/694, 695, 408, 402, 428/447, 425.9, 522, 323, 900, 328, 329; 427/128, 131; 360/134–136

[56] References Cited

U.S. PATENT DOCUMENTS

| | | | |
|---|---|---|---|
| 4,267,206 | 5/1981 | Johnson | 428/900 |
| 4,419,406 | 12/1983 | Isobe | 428/900 |
| 4,431,703 | 2/1984 | Somezawa | 428/447 |
| 4,469,750 | 9/1984 | Fujiki | 428/900 |
| 4,469,751 | 9/1984 | Kobayashi | 428/900 |
| 4,501,800 | 2/1985 | Fujiki | 428/900 |
| 4,501,801 | 2/1985 | Kimura | 428/900 |
| 4,555,443 | 11/1985 | Kikugawa | 428/900 |
| 4,591,528 | 5/1986 | Nishimatsu | 428/900 |
| 4,592,942 | 6/1986 | Nishimatsu | 428/900 |
| 4,629,646 | 12/1986 | Idee | 428/408 |
| 4,686,139 | 8/1987 | Ryoke | 428/408 |
| 4,741,960 | 3/1988 | Takita | 428/695 |

FOREIGN PATENT DOCUMENTS

| | | |
|---|---|---|
| 2250383 | 5/1974 | Fed. Rep. of Germany . |
| 3327279 | 4/1984 | Fed. Rep. of Germany . |
| 1416946 | 12/1975 | United Kingdom . |

OTHER PUBLICATIONS

Ullmanns Encyklopädie D. Techn. Chemie, 3. edition, vol. 14, pp. 793 to 795, 803 to 810.

*Primary Examiner*—Ellis P. Robinson
*Attorney, Agent, or Firm*—Lowe, Price, LeBlanc, Becker & Shur

[57] ABSTRACT

A magnetic recording medium comprising a non-magnetic support, a magnetic recording layer formed on one side of the support, and a back coat layer formed on the other side. The back coat layer is formed of a composition which comprises a dispersion, in a resin binder, of carbon black having a pH of 2.0 to 8.5 and a coloring power not less than 90 as determined by the ASTM method. The dispersion may further comprise a specific type of aliphatic acid-modified, fluorinated organosilicone in order to improve the travellability and durability of the medium.

7 Claims, No Drawings

MAGNETIC RECORDING MEDIUM HAVING A BACK COAT LAYER CONTAINING CARBON BLACK HAVING DEFINED RANGES OF PH AND COLORING POWER

BACKGROUND OF THE INVENTION

1. Field of the Invention

This invention relates to magnetic recording mediums such as, for example, magnetic tapes.

2. Description of the Prior Art

For high density recording, it is usual to use very finely divided magnetic powder in a magnetic layer of magnetic recording mediums. The use of the very finely divided powder results in a large light transmittance of the magnetic layer, so that magnetic recording and reproducing apparatus may not be operated normally. In domestic video tape recorders, for instance, the magnetic tape being run is stopped on detection of a transparent leader tape portion which is provided at one end of the magnetic tape. More specifically, the apparatus includes a tape end detector which is able to detect light which is transmitted through the leader tape portion, by which the magnetic tape is stopped. When the light transmittance becomes large in portions other than the leader tape portion, the tape end detector is liable to malfunction.

In order to prevent the malfunction of the tape end detector, carbon black is generally added to the magnetic layer in large amounts so as to reduce the light transmittance of the magnetic layer. However, when carbon black is added to a magnetic paint in large amounts, dispersability of a magnetic powder becomes poor, bringing about a lowering of electromagnetic conversion characteristics of the resultant magnetic recording medium.

In order that the light transmittance in portions of the magnetic layer is reduced without addition of large amount of carbon black to the magnetic layer, there has been proposed a magnetic recording medium in which a back coat layer containing carbon black is formed on a support on the side which is opposite to a magnetic layer-bearing side.

For the formation of the back coat layer, it is necessary from the standpoint of productivity to prepare a paint containing large amounts of carbon black. However, the carbon black-containing paint tends to harden or coagulate within a short time. The pot life of the paint is short because of the presence of carbon black. Accordingly, the prepared paint has to be applied onto a support before commencement of the hardening, thus impeding the productivity of the medium to a substantial extent. If, on the contrary, the content of carbon black is reduced so as to prolong the pot life, a satisfactory light transmittance cannot be expected in spite of the formation of the back coat layer.

SUMMARY OF THE INVENTION

It is accordingly an object of the invention to provide a magnetic recording medium of the type which comprises a back coat layer containing carbon black of a specific type whereby the light transmittance of the back coat layer can be reduced without lowering productivity.

It is another object of the invention to provide a magnetic recording medium which has good electromagnetic conversion characteristics and does not cause malfunction of a tape end detector of a magnetic recording and reproducing apparatus.

It is a further object of the invention to provide a magnetic recording medium which has an improved coefficient of dynamic friction and a good travelling performance.

It is a still further object of the invention to provide a magnetic recording medium whose back coat layer is obtained from a paint of carbon black having a prolonged pot life whereby a large amount of the paint can be prepared at one time, ensuring formation of the back coat layer at a low cost.

The magnetic recording medium according to the invention comprises a non-magnetic substrate, a magnetic recording layer formed on one side of the substrate, and a back coat layer formed on the other side. The back coat layer is formed of a composition which comprises carbon black dispersed in a resin binder. The present invention is characterized in that the carbon black used has a pH value of from 2.0 to 8.5 and a coloring power not less than 90 as determined by the method prescribed in ASTM. Even if this type of carbon black is used in large amounts, the pot life of the resultant paint is prolonged and the light transmittance of the back coat layer is low. In order to improve the travelling performance of the medium, aliphatic acid-modified organosilicones may be further added to the back coating paint.

DETAILED DESCRIPTION AND EMBODIMENTS OF THE INVENTION

The back coat layer is made of a dispersion of carbon black, as defined above, in resin binders. The carbon black should have a pH of from 2.0 to 8.5, preferably 2.5 to 5.0, and a coloring power not less than 90, preferably from 100 to 140. Such carbon black has several merits: it is well dispersed in a paint; the carbon black is relatively inert to resins and additives, such as a curing agent, so that the pot life is prolonged; and it is possible to form a back coat layer having a small light transmittance in high productivity. If the pH exceeds 8.5, the reaction with resins or additives is promoted to shorten the pot life. On the other hand, when the pH is smaller than 2, the dispersability lowers, so that carbon black remains as coagulated and thus, the light transmittance of the back coat layer is not reduced.

In order to reduce the light transmittance by the use of carbon black having a defined range of pH, relatively large amounts are still required, which may lead to a lowering of dispersability and shortage of the pot life. To avoid this, carbon black should also have a coloring power not less than 90, preferably from 100 to 140, as determined by the method prescribed in ASTM D-3051-76.

The carbon black has generally an average size below 1 micrometer, preferably from 0.01 to 0.05 micrometers in order to form a back coat layer of good surface and characteristic properties.

The amount of the carbon black in the back coat layer is preferably in the range of from 25 to 400 parts by weight per 100 parts by weight of a binder. Examples of the binders suitable for these purposes include a variety of synthetic or semi-synthetic resins such as vinyl chloride resins, vinyl chloride-vinyl acetate copolymers, vinyl chloride-vinylidene chloride copolymers, acrylic ester-styrene copolymers, methacrylic ester-styrene copolymers, acrylic ester-vinylidene chloride copolymers, methacrylic ester-vinylidene chloride copolymers, urethane elastomers, cellulose derivatives such as nitro cellulose, vinyl chloride-vinyl acetate-vinyl alcohol terpolymers, phenolic resin, epoxy resins, alkyd resins, silicone resins, urea-formaldehyde resins, isocyanate and polyol resins, and mixtures thereof. Of these, vinyl chloride resins, urethane resin, nitro cellulose and mixtures thereof are preferably used.

For the formation of the back coat layer, carbon black having a pH and a coloring power as defined above and a resin binder are mixed and dispersed in a solvent by a suitable means such as a sand mill, to obtain a paint. The paint is applied onto a non-magnetic support after or prior to formation of a magnetic recording layer on the support, followed by drying and calendering as usual. The solvents for the binder may be various compounds including alcohols such as methanol, ethanol and the like, aromatic compound such as xylene, toluene, benzene and the like, ketones such as acetone, methyl ethyl ketone, methyl isobutyl ketone and the like, and mixtures thereof. The back coat layer is generally formed in a thickness of from 0.3 to 4 micrometers.

As a matter of course, a paint for the back coating may further comprise additives such as lubricants, dispersants and the like as is known in the art.

Although the back coat layer having a specific type of carbon black is particularly effective in reducing the light transmittance, the back coat layer should preferably have further improved travellability and durability, by which fluctuation of pictures can be reduced in reproducing operations.

For this purpose, an aliphatic acid-modified fluorinated organosilicone of the following general formula (A) is added to the back coat layer:

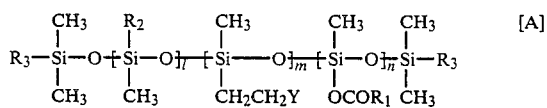

in which $R_1$ represents a saturated or unsaturated hydrocarbon group having from 7 to 21 carbon atoms, $R_2$ represents a methyl or phenyl group, each $R_3$ represents $-OCOR_1$ wherein $R_1$ has the same meaning as defined above, Y represents $-CF_3$ or $-(CF_2)_k-W$ in which W represents hydrogen or fluorine, k is an integer of from 1 to 8, and l, m and n are, respectively, an integer within ranges that $0 \leq l < 200$, $1 \leq m < 100$, $1 \leq n < 100$ and $1 + m + n \leq 300$.

Since the organosilicone has aliphatic groups in the molecule thereof, it is miscible with resin binders. Because of the presence of the fluorinated group, the organosilicone is unlikely to exude under high temperature and high humidity conditions and is thus stable. Accordingly, the magnetic recording medium containing the organosilicone in the back coat layer has a small coefficient of dynamic friction and improved travellability and durability.

In the above general formula, $R_1$ is defined to have from 7 to 21 carbon atoms. This is because when the number of carbon atoms is below 6, inclusive, the lubricity becomes poor. On the other hand, when the number of carbon atoms is over 21, the miscibility with binder resins lowers.

$R_2$ is a methyl or phenyl group. With the phenyl group, the content of the phenyl groups should preferably be not larger than 10 mole% of all organic groups joined to the Si atoms.

$R_3$ is an aliphatic acid residue represented by $-OCOR_1$ and includes, for exmple, a saturated aliphatic acid residue such as capryl, decyl, lauryl, myristyl, palmityl, stearyl, behenyl or the like, or an unsaturated aliphatic acid residue such as zoomaryl, oleyl, linoleyl, linolenyl, gadoleyl or the like.

The organosilicone is preferably used in an amount of 0.5 to 4.5 parts by weight per 100 parts by weight of a resin binder.

The magnetic recording layer formed on the other side of the non-magnetic support may be made of any known magnetic resin compositions comprising ferromagnetic metal oxides, metals, and alloys of the metals in the form of fine powder dispersed in various types of binders as indicated above. The non-magnetic supports may be in the form of films, foils, sheets, disks and the like, and may be made of a variety of materials including, for example, polyesters, polyolefins, cellulose derivatives and the like, glasses, or ceramics.

The present invention is more particularly described by way of examples.

EXAMPLE 1

A magnetic paint was applied on one side of a base film and dried to form a magnetic layer thereon. A paint for back coating was prepared by mixing 100 parts by weight of carbon black having a pH of 3, a coloring power of 100 and an average particle size of 24 m$\mu$, 40 parts by weight of nitro cellulose, 30 parts by weight of polyurethane resin, 2 parts by weight of a silicone oil, and 450 parts by weight of a mixture, in equal amounts, of methyl ethyl ketone, toluene and methyl isobutyl ketone in a sand mill, followed by further adding 30 parts by weight of a polyisocyanate curing agent to obtain a paint for back coating. The paint was applied onto the other side of the base film, followed by drying and calendering to obtain a back coat layer in a dry thickness of 0.8 micrometers. Thus, a magnetic tape having the magnetic layer on one side and the back coat layer on the other side was obtained.

EXAMPLE 2

The general procedure of Example 1 was repeated except that carbon black having a pH of 6 and a coloring power of 120 was used, thereby obtaining a magnetic tape.

EXAMPLE 3

The general procedure of Example 1 was repeated except that carbon black having a pH of 8 and a coloring power of 140 was used, thereby obtaining a magnetic tape.

COMPARATIVE EXAMPLE 1

The general procedure of Example 1 was repeated except that carbon black having a pH of 1.5 and a coloring power of 100 was used, thereby obtaining a magnetic tape.

COMPARATIVE EXAMPLE 2

The general procedure of Example 1 was repeated except that carbon black having a pH of 9.0 and a coloring power of 100 was used, thereby obtaining a magnetic tape.

COMPARATIVE EXAMPLE 3

The general procedure of Example 1 was repeated except that carbon black having a pH of 9.0 and a coloring power of 80 was used, thereby obtaining a magnetic tape.

The tapes obtained in the above examples and comparative examples were subjected to measurement of an electromagnetic conversion characteristic evaluated as a difference from the value of a reference tape and a light transmittance at a wavelength of 8000 to 9000 angstroms. In addition, the pot life of the respective paints for back coating was determined as a time before gelation took place. The results are shown in Table 1 below.

TABLE 1

|  | Electromagnetic Conversion Characteristic (dB) | Light Transmittance (%) | Pot Life (Hrs.) |
| --- | --- | --- | --- |
| Example: | | | |
| 1 | 0.7 | 0.008 | 16 |
| 2 | 0.7 | 0.007 | 16 |
| 3 | 0.6 | 0.005 | 15 |
| Comparative Example: | | | |
| 1 | 0 | 0.01 | 16 |
| 2 | 0.3 | 0.01 | 6 |
| 3 | 0.3 | 0.023 | 7 |

As will be seen from the above results, when carbon black having a pH of 2.0 to 8.5 and a coloring power not less than 90 is used in the back coat layer, the electromagnetic conversion characteristic is good and the light transmittance is very small, so that such tapes have no fear of causing malfunction of a tape end detector. In addition, the pot life of the paints of the invention is so long that it can be prepared in large amounts at a time, leading to good productivity.

In contrast, when the pH of carbon black is smaller than the range defined in the present invention, the electromagnetic conversion characteristic is not good and the light transmittance is relatively high. Likewise, when the pH is larger, the electromagnetic conversion characteristic is not so good with a relatively high the light transmittance. In addition, the pot life of the paints is very short.

When carbon black having a low color power is used as in Comparative Example 1, the light transmittance abruptly increases.

EXAMPLE 4

A magnetic paint was applied onto a base film and dried to form a magnetic layer on one side of the base film. A paint for back coating was prepared by mixing, in a sand mill, 100 parts by weight of carbon black having a pH of 4, a coloring power of 110 and an average particle size of 18 m$\mu$, 2 parts by weight of an aliphatic acid-modified fluorinated organosilicone of the formula (A) in which $R_1=C_{17}H_{33}$, $R_2=CH_3$, $R_3=C_{17}H_{33}COO$, $Y=CF_3$, $l=45$, $m=38$, $n=13$, 40 parts by weight of nitro cellulose, 30 parts by weight of polyurethane resin, and 450 parts by weight of methyl ethyl ketone, toluene and methyl isobutyl ketone in equal amounts, followed by further adding 30 parts by weight of a polyisocyanate curing agent, thereby obtaining a paint. This paint was applied onto the other side of the base film, dried and calendered to form a 0.5 micrometer thick back coat layer, thereby obtaining a magnetic tape.

EXAMPLE 5

The general procedure of Example 4 was repeated except that carbon black having a pH of 7, a coloring power of 140 and an average particle size of 24 m$\mu$ was used, thereby obtaining a magnetic tape.

EXAMPLE 6

The general procedure of Example 4 was repeated except that there was used an aliphatic acid-modified, fluorinated organosilicone of the general formula (A) in which $R_1=C_{13}H_{27}$, $R_2=CH_3$, $R_3=C_{13}H_{27}COO$, $Y=CF_3$, $l=30$, $m=38$ and $n=20$, thereby obtaining a magnetic tape.

EXAMPLE 7

The general procedure of Example 5 was repeated except that there was used an aliphatic acid-modified, fluorinated organosilicone of the general formula (A) in which $R_1=C_{13}H_{27}$, $R_2=CH_3$, $R_3=C_{13}H_{27}COO$, $Y=(CF_2)_7CF_3$, $l=25$, $m=6$ and $n=14$, thereby obtaining a magnetic tape.

COMPARATIVE EXAMPLE 4

The general procedure of Example 4 was repeated except that carbon black having a pH of 9.0, a coloring power of 80 and an average particle size of 18 m$\mu$ was used, thereby obtaining a magnetic tape.

COMPARATIVE EXAMPLE 5

The general procedure of Example 4 was repeated except carbon black having a pH of 1.5, a coloring power of 100 and an average particle size of 24 m$\mu$ was used, thereby obtaining a magnetic tape.

COMPARATIVE EXAMPLE 6

The general procedure of Example 4 was repeated except that there was used, instead of the modified organosilicone, a silicone of the following formula

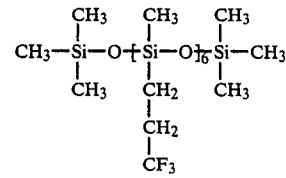

to obtain a magnetic tape.

The magnetic tapes obtained in Examples 4 to 7 and Comparative Examples 4 to 6 were subjected to measurement of an electromagnetic conversion characteristic, a light transmittance at a wavelength of 8000 to 9000 angstroms, and a coefficient of dynamic friction. The pot life of the respective paints was also determined as a time before gelation took place. The results are shown in Table 2 below.

TABLE 2

|  | Electromagnetic Conversion characteristic (dB) | Light Transmittance (%) | Coefficient of Dynamic Friction | Pot Life (Hrs.) |
| --- | --- | --- | --- | --- |
| Example: | | | | |
| 4 | 0.7 | 0.008 | 0.21 | 16 |
| 5 | 0.7 | 0.007 | 0.19 | 16 |
| 6 | 0.6 | 0.005 | 0.20 | 15 |
| 7 | 0.7 | 0.007 | 0.19 | 16 |
| Comparative | | | | |

TABLE 2-continued

| | Electromagnetic Conversion characteristic (dB) | Light Transmittance (%) | Coefficient of Dynamic Friction | Pot Life (Hrs.) |
|---|---|---|---|---|
| Example: | | | | |
| 4 | 0.3 | 0.023 | 0.19 | 7 |
| 5 | 0 | 0.010 | 0.20 | 16 |
| 6 | 0.6 | 0.010 | 0.26 | 14 |

From the above results, it will be seen that the addition of the organosilicone is effective in improving the coefficient of dynamic friction. When the organosilicone is used in combination with carbon black having defined ranges of pH and coloring power, the electromagnetic conversion characteristic and the light transmittance are satisfactory.

When the aliphatic acid-modified, fluorinated organosilicone is not used, the coefficient of dynamic friction is so high that the travellability of the tape is inferior. In addition, the light transmittance becomes relatively high because of the relatively poor dispersability of carbon black.

What is claimed is:

1. In a magnetic recording medium which comprises a non-magnetic support, a magnetic recording layer formed on one side of said support, and a back coat layer formed on the other side of said support, the improvement characterized in that said back coat layer is made of a composition which comprises a dispersion, in 100 parts by weight of a resin binder, of from 25 to 400 parts by weight carbon black having a pH of from 2.0 to 8.5, a coloring power not less than 90 when determined by the method prescribed in ASTM D-3051-76, and an average size of from 0.01 to 0.05 micrometers.

2. A magnetic recording medium according to claim 1, wherein the carbon black has a pH of from 2.5 to 5.0, and a coloring power of from 100 to 140.

3. A magnetic recording medium according to claim 1, wherein the resin binder is a member selected from the group consisting of vinyl chloride resins, urethane resins and nitro cellulose.

4. A magnetic recording medium according to claim 1, further comprising 0.5 to 4.5 parts by weight, per 100 parts by weight of the resin binder, of an aliphatic acid-modified, fluorinated organosilicone of the general formula

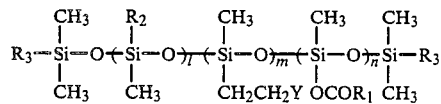

in which $R_1$ represents a saturated or unsaturated hydrocarbon group having from 7 to 21 carbon atoms, $R_2$ represents a methyl or phenyl group, each $R_3$ represents $-OCOR_1$ wherein $R_1$ has the same meaning as defined above, Y represents $-CF_3$ or $-(CF_2)_k-W$ in which W represents hydrogen or fluorine, k is an integer of from 1 to 8, and l, m and n are, respectively, an integer within ranges that $0 \leq l < 200$, $1 \leq m < 100$, $1 \leq n < 100$ and $1 + m + n \leq 300$.

5. A magnetic recording medium according to claim 4, wherein, in the formula, $R_2$ is a methyl group.

6. A magnetic recording medium according to claim 4, wherein said $R_2$ is a phenyl group.

7. A magnetic recording medium according to claim 6, wherein the content of the phenyl groups in the organosilicone is not larger than 10 mole% of the total organic groups joined to Si atoms of the organosilicone.

* * * * *